US012533684B2

(12) United States Patent
Mazz et al.

(10) Patent No.: US 12,533,684 B2
(45) Date of Patent: Jan. 27, 2026

(54) SPRAY HEAD WITH HYPERBOLOID SPRAY PATTERN

(71) Applicant: Kohler Co., Kohler, WI (US)

(72) Inventors: Margaret C. Mazz, Atlanta, GA (US); Rafael A. Rexach, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 638 days.

(21) Appl. No.: 17/239,165

(22) Filed: Apr. 23, 2021

(65) Prior Publication Data

US 2021/0237101 A1 Aug. 5, 2021

Related U.S. Application Data

(63) Continuation of application No. 15/376,430, filed on Dec. 12, 2016, now Pat. No. 10,987,680.

(60) Provisional application No. 62/268,211, filed on Dec. 16, 2015.

(51) Int. Cl.

| | |
|---|---|
| ***B05B 1/06*** | (2006.01) |
| ***B05B 1/16*** | (2006.01) |
| ***B05B 1/18*** | (2006.01) |
| ***B05B 7/08*** | (2006.01) |
| ***E03C 1/04*** | (2006.01) |

(52) U.S. Cl.

CPC .................. *B05B 1/06* (2013.01); *B05B 1/16* (2013.01); *B05B 1/18* (2013.01); *B05B 7/0892* (2013.01); *E03C 1/0405* (2013.01)

(58) Field of Classification Search

CPC .... B05B 1/06; B05B 1/16; B05B 1/18; B05B 7/0892; B05B 1/02; B05B 13/0278; E03C 1/0405

See application file for complete search history.

(56) References Cited

U.S. PATENT DOCUMENTS

| | | | |
|---|---|---|---|
| 1,054,922 | A | 3/1913 | Kenney |
| 1,408,521 | A | 3/1922 | Lathrop |
| 1,534,546 | A | 4/1925 | Ross |
| 1,568,427 | A | 1/1926 | Strachan et al. |
| 1,667,943 | A | 5/1928 | Munz |

(Continued)

FOREIGN PATENT DOCUMENTS

| | | |
|---|---|---|
| CN | 102059181 | 5/2011 |
| CN | 204842301 | * 12/2015 |

(Continued)

OTHER PUBLICATIONS

Chinese First Office Action CN Application No. 201910328692.5 dated Nov. 2, 2020 6 pages.

(Continued)

*Primary Examiner* — Qingzhang Zhou
*Assistant Examiner* — Joel Zhou
(74) *Attorney, Agent, or Firm* — Foley & Lardner LLP

(57) ABSTRACT

A spray head includes a first plurality of nozzles for emitting water in a first spray pattern and a second plurality of nozzles for emitting the water in a second spray pattern. In at least one mode of operation, the water is emitted from both the first plurality of nozzles and the second plurality of nozzles with the second spray pattern being at least partially encompassed within the first spray pattern; and wherein at least one of the first or second spray pattern is a hyperboloidal shape.

10 Claims, 12 Drawing Sheets

(56) References Cited

U.S. PATENT DOCUMENTS

| | | | |
|---|---|---|---|
| 1,722,158 | A | 7/1929 | Reiffenstein |
| 1,948,807 | A | 2/1934 | Taylor |
| 2,000,792 | A | 5/1935 | Schmiedeknecht |
| 2,070,696 | A | 2/1937 | Tracy |
| 2,080,264 | A | 5/1937 | Gray |
| 2,161,047 | A | 6/1939 | Holden |
| 2,211,106 | A | 8/1940 | Elliott |
| 2,284,443 | A | 5/1942 | Paradise |
| 2,285,831 | A | 6/1942 | Pennypacker |
| 2,302,021 | A | 11/1942 | Freeman |
| 2,305,210 | A | 12/1942 | Wahlin |
| 2,335,657 | A | 11/1943 | Eweson |
| 2,348,776 | A | 5/1944 | Bentley |
| 2,433,463 | A | 12/1947 | Lampe |
| 2,456,703 | A | 12/1948 | Hatchette |
| 2,520,770 | A | 8/1950 | Manville |
| 2,559,894 | A | 7/1951 | Nordell |
| 2,580,722 | A | 1/1952 | Bentley |
| 2,583,232 | A | 1/1952 | Russell |
| 2,646,313 | A | 7/1953 | Peeps |
| 2,701,412 | A | 2/1955 | Wahlin |
| 2,746,792 | A | 5/1956 | Hough |
| 2,747,936 | A | 5/1956 | Wahlin |
| 2,785,926 | A | 3/1957 | Lataste |
| 2,829,379 | A | 4/1958 | Mcgee |
| 2,850,328 | A | 9/1958 | Young |
| 2,900,139 | A | 8/1959 | Hensley, Jr. |
| 2,942,790 | A | 6/1960 | Starkey |
| 2,974,877 | A | 3/1961 | Hruby, Jr. |
| 3,057,561 | A | 10/1962 | Corlett |
| 3,107,860 | A | 10/1963 | Umbricht |
| 3,151,811 | A | 10/1964 | Hruby |
| 3,342,419 | A | 9/1967 | Weese |
| 3,465,968 | A | 9/1969 | Halpern |
| 3,485,451 | A | 12/1969 | Gore |
| 3,533,555 | A | 10/1970 | Billeter |
| 3,547,352 | A | 12/1970 | Hadsel |
| 3,547,353 | A | 12/1970 | Pecka |
| 3,721,252 | A | 3/1973 | Ayella |
| 3,741,481 | A | 6/1973 | Bauer |
| 3,770,200 | A | 11/1973 | Bauer et al. |
| 3,776,469 | A | 12/1973 | Joannon |
| 3,820,716 | A | 6/1974 | Bauer |
| 3,858,252 | A | 1/1975 | Ejchorszt |
| 3,963,179 | A | 6/1976 | Tomaro |
| 3,967,783 | A | 7/1976 | Halsted et al. |
| 3,998,390 | A | 12/1976 | Peterson et al. |
| 4,010,899 | A | 3/1977 | Heitzman |
| 4,013,230 | A | 3/1977 | Gondek |
| 4,018,385 | A | 4/1977 | Bruno |
| 4,043,511 | A | 8/1977 | Nakamura |
| 4,122,845 | A | 10/1978 | Stouffer et al. |
| 4,151,955 | A | 5/1979 | Stouffer |
| 4,184,636 | A | 1/1980 | Bauer |
| 4,236,674 | A | 12/1980 | Dixon |
| 4,394,965 | A | 7/1983 | Backe et al. |
| 4,398,669 | A | 8/1983 | Fienhold |
| 4,426,040 | A | 1/1984 | Smith |
| 4,471,913 | A | 9/1984 | Hofmann |
| 4,618,100 | A | 10/1986 | White et al. |
| 4,765,540 | A | 8/1988 | Yie |
| 4,927,083 | A | 5/1990 | Daunt |
| 4,928,402 | A | 5/1990 | Allen |
| 4,991,314 | A | 2/1991 | Allen |
| 5,090,624 | A | 2/1992 | Rogers |
| 5,102,048 | A | 4/1992 | Bohnhoff |
| 5,106,022 | A | 4/1992 | Pook |
| 5,172,862 | A | 12/1992 | Heimann et al. |
| 5,230,472 | A | 7/1993 | McCabe |
| 5,297,739 | A | 3/1994 | Allen |
| 5,316,216 | A | 5/1994 | Cammack et al. |
| 5,499,767 | A | 3/1996 | Morand |
| 5,558,278 | A | 9/1996 | Gallorini |
| 5,647,537 | A | 7/1997 | Bergmann |
| 5,699,964 | A | 12/1997 | Bergmann et al. |
| 5,961,046 | A | 10/1999 | Joubran |
| 6,113,002 | A | 9/2000 | Finkbeiner |
| 6,217,534 | B1 | 4/2001 | Natalicio |
| 6,378,790 | B1 | 4/2002 | Paterson et al. |
| 6,463,658 | B1 | 10/2002 | Larsson |
| 6,554,212 | B2 | 4/2003 | Borcea et al. |
| 6,622,947 | B1 | 9/2003 | Rivera |
| 6,719,218 | B2 | 4/2004 | Cool et al. |
| 6,735,883 | B1 | 5/2004 | Bria et al. |
| 6,776,357 | B1 | 8/2004 | Naito |
| 6,795,981 | B2 | 9/2004 | Sato |
| 6,896,201 | B1 | 5/2005 | Ouyoung |
| 6,962,298 | B1 | 11/2005 | Martin |
| 6,983,898 | B2 | 1/2006 | Clark |
| 7,048,210 | B2 | 5/2006 | Clark |
| 7,055,767 | B1 | 6/2006 | Ko |
| 7,111,798 | B2 | 9/2006 | Thomas et al. |
| 7,111,800 | B2 | 9/2006 | Berning et al. |
| 7,278,591 | B2 | 10/2007 | Clearman et al. |
| 7,360,723 | B2 | 4/2008 | Lev |
| 7,374,112 | B1 | 5/2008 | Bulan et al. |
| 7,584,906 | B2 | 9/2009 | Lev |
| 7,628,341 | B2 | 12/2009 | Kajuch |
| 7,721,979 | B2 | 5/2010 | Mazzola |
| 7,740,186 | B2 | 6/2010 | Macan et al. |
| 7,770,820 | B2 | 8/2010 | Clearman et al. |
| 7,854,401 | B2 | 12/2010 | Malek |
| 7,878,419 | B2 | 2/2011 | Waddelow |
| 7,959,088 | B2 | 6/2011 | Bolus et al. |
| 8,177,147 | B2 | 5/2012 | Engel |
| 8,292,200 | B2 | 10/2012 | Macan et al. |
| 8,403,240 | B2 | 3/2013 | Chen |
| 8,733,675 | B2 | 5/2014 | Leber |
| 8,770,495 | B2 | 7/2014 | Chen |
| 8,967,499 | B2 | 3/2015 | Lee |
| 8,985,483 | B2 | 3/2015 | Petrovic |
| 9,056,325 | B2 | 6/2015 | Torontow |
| 9,067,222 | B2 | 6/2015 | Gransow et al. |
| 9,073,071 | B2 | 7/2015 | Tsai |
| 9,623,423 | B2 | 4/2017 | Erickson |
| 9,630,192 | B2 | 4/2017 | Kusu |
| 2002/0113145 | A1 | 8/2002 | Wong |
| 2003/0019957 | A1 | 1/2003 | Titinet |
| 2003/0029936 | A1 | 2/2003 | Clark |
| 2003/0038189 | A1 | 2/2003 | Clerico Titinet |
| 2003/0127142 | A1 | 7/2003 | Stouffer |
| 2004/0016828 | A1 | 1/2004 | Duan |
| 2005/0273945 | A1 | 12/2005 | Zaccone |
| 2006/0144968 | A1 | 7/2006 | Lev |
| 2006/0226256 | A1 | 10/2006 | Deboer et al. |
| 2007/0246577 | A1* | 10/2007 | Leber ........................ B05B 1/18 239/548 |
| 2008/0272203 | A1 | 11/2008 | Leber |
| 2010/0065657 | A1 | 3/2010 | Lee |
| 2011/0139886 | A1* | 6/2011 | Peng ..................... B05B 1/1627 239/533.13 |
| 2011/0174894 | A1 | 7/2011 | Miller et al. |
| 2012/0228407 | A1 | 9/2012 | Torontow |
| 2013/0118538 | A1 | 5/2013 | Zhou et al. |
| 2013/0292497 | A1 | 11/2013 | Allen |
| 2013/0299608 | A1 | 11/2013 | Spangler et al. |
| 2014/0008467 | A1 | 1/2014 | Allard |
| 2014/0138461 | A1 | 5/2014 | Kajuch |
| 2014/0263711 | A1 | 9/2014 | Fraser et al. |
| 2015/0004814 | A1 | 1/2015 | Feldmeier |
| 2015/0014447 | A1 | 1/2015 | Akahira et al. |
| 2015/0115067 | A1 | 4/2015 | Lin |
| 2015/0143625 | A1 | 5/2015 | Veurink et al. |
| 2015/0165451 | A1 | 6/2015 | Gopalan et al. |
| 2016/0325292 | A1 | 11/2016 | Hawkins |
| 2017/0173601 | A1 | 6/2017 | Mazz et al. |
| 2018/0078953 | A1 | 3/2018 | Renner |
| 2018/0161787 | A1 | 6/2018 | Gao et al. |

FOREIGN PATENT DOCUMENTS

| | | |
|---|---|---|
| CN | 205949103 U | 2/2017 |
| DE | 41 40 105 | 6/1993 |
| DE | 20 2015 007 728 U1 | 11/2015 |

(56) References Cited

FOREIGN PATENT DOCUMENTS

| | | | |
|---|---|---|---|
| EP | 2 620 224 | A2 | 7/2013 |
| FR | 2454837 | A1 | 11/1980 |
| FR | 2815552 | | 4/2002 |
| GB | 2 068 778 | | 8/1981 |
| JP | H01-123012 | | 5/1989 |
| JP | H291654 | U | 7/1990 |
| WO | WO-2013/141719 | A1 | 9/2013 |
| WO | WO-2016/091398 | A1 | 6/2016 |
| WO | WO-2016/162048 | | 10/2016 |

OTHER PUBLICATIONS

Extended European Search Report issued in corresponding U.S. Appl. No. 16/203,658 dated Apr. 18, 2017.

http:/thesweethome.com/reviews/the-best-shower-head/; dated Oct. 27, 2016.

Notice of Allowance on U.S. Appl. No. 16/390,332 Dtd Apr. 20, 2021.

* cited by examiner

DRY-ZONE

WIDE COVERAGE

STRONGER RINSE

A "HYPERBOLOID" SPRAY CREATES VARYING AREAS OF CONCENTRATION (AN HOURGLASS SHAPE) BY ANGLING STREAMS THAT DO NOT COLLIDE.

OVAL TO CIRCLE

CIRCLE TO OVAL

CIRCLE TO FREE-FORM

PASS THROUGH, CREATING MULTIPLE CONVERGENCE ZONES

NESTING

STREAMS PASS THROUGH HYPERBOLOID SHAPE

STREAMS CONFINED WITHIN HYPERBOLOID SHAPE

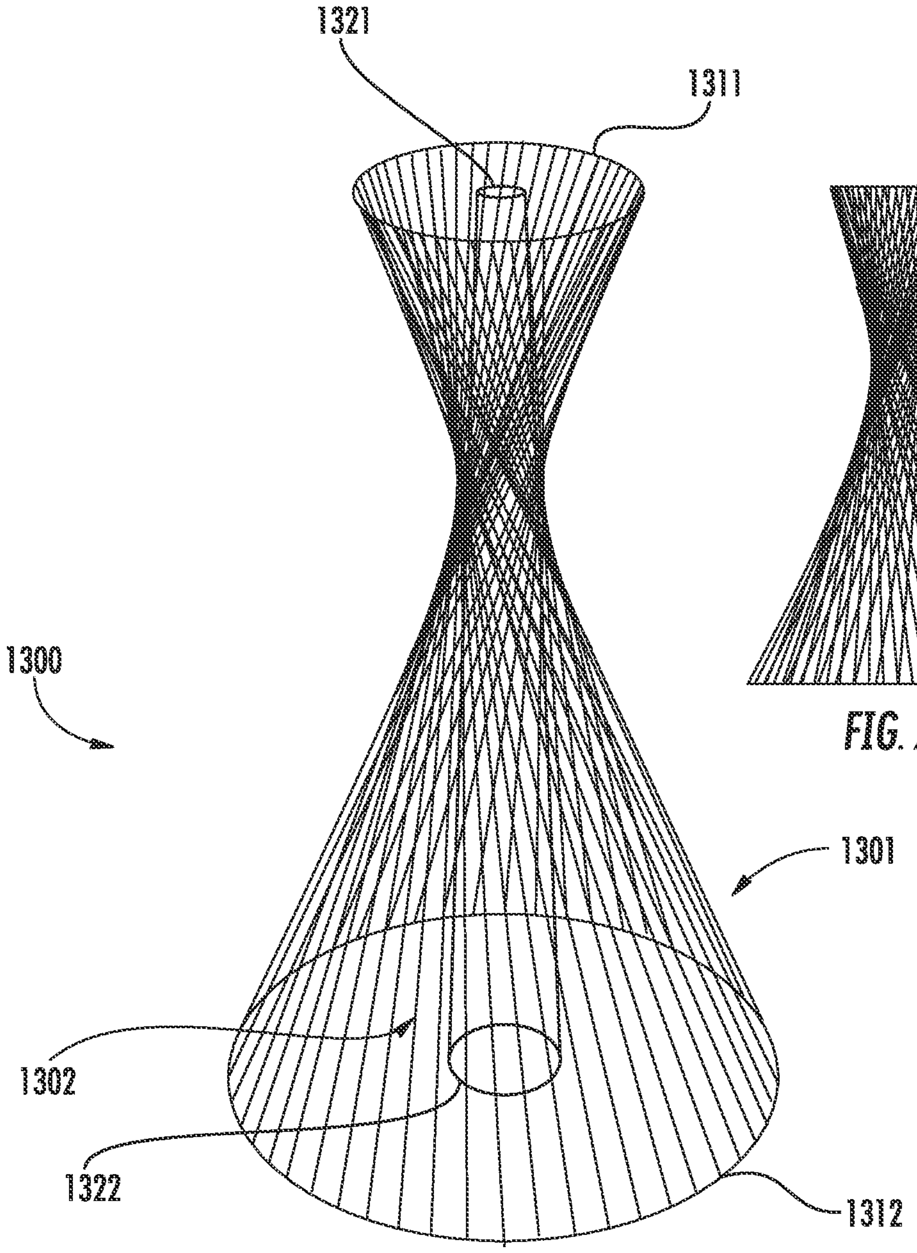
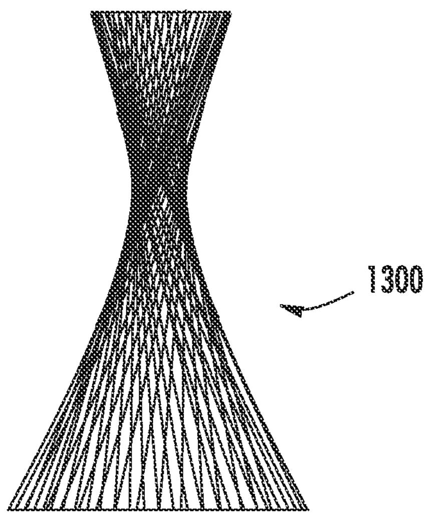
FIG. 20
HYPERBOLOID SHAPE
WITH SILK SPRAY IN CENTER
FIG. 19

SPRAY HEAD WITH HYPERBOLOID SPRAY PATTERN

CROSS-REFERENCE TO RELATED APPLICATIONS

This application is a continuation of U.S. patent application Ser. No. 15/376,430, filed Dec. 12, 2016, which claims the benefit of and priority to U.S. Provisional Patent Application No. 62/268,211, filed on Dec. 16, 2015, both of which are incorporated by reference herein in their entireties.

BACKGROUND

The present application relates generally to the field of spray heads for use with showers, faucets, side-sprays, and other spraying devices that are configured to direct a fluid (e.g., water) in one or more spray patterns. More specifically, this application relates to spray heads configured to direct a plurality of streams of water to form a spray pattern of water having a generally hyperboloid shape.

Spray heads are used to direct a spray of water onto, for example, people, dishes, produce, and other objects for the purpose of cleaning. For example, showerheads are configured to direct water into spray patterns to clean people, pets, and other objects. Also for example, faucets and side sprays are configured, typically, for use with sinks to direct water into spray patterns to clean dishes, produce, as well as people and other objects.

SUMMARY

At least one embodiment relates to a spray head for directing water into a spray pattern. The spray head includes a casing configured to receive a supply of water and a plurality of nozzles disposed on the casing. Each nozzle is configured to emit water in a stream away from the casing, and the plurality of streams of water from the plurality of nozzles form a hyperboloidal shaped spray pattern.

Each stream of water may be configured not to intersect any other stream of water from the plurality of streams of the spray head. Each nozzle of the plurality of nozzles may be aligned at a compound angle relative to a face of the casing. Each nozzle of the plurality of nozzles may be recessed in the face of the casing. Each nozzle of the plurality of nozzles may be configured to protrude away from the face of the casing.

The spray head may further include a second plurality of nozzles configured to emit a second plurality of streams of water to form a second spray pattern. The second spray pattern may be configured to nest within the hyperboloidal shaped spray pattern from the first plurality of nozzles. Each stream of the second plurality of streams of water may be configured to not intersect with any stream of the first plurality of streams of water. The second plurality of streams of water may be configured to form a second spray pattern that passes through the hyperboloidal shaped spray pattern.

The spray head may be part of a faucet, a showerhead, or any other suitable spraying device.

At least one embodiment relates to a spray head configured to receive water from a supply line. The spray head includes a casing mountable to the supply line to receive the water, a first plurality of nozzles arranged on the casing in a first pattern for emitting the water in a first spray pattern, and a second plurality of nozzles arranged on the casing in a second pattern for emitting the water in a second spray pattern. In a first mode of operation (of the spray head), water is emitted from just one of the first plurality of nozzles or the second plurality of nozzles. In a second mode of operation, water is emitted from both the first plurality of nozzles and the second plurality of nozzles with the second spray pattern being nested within the first spray pattern. At least one of the first and second spray patterns is hyperboloidal shaped.

Both of the first and second spray patterns may be hyperboloidal shaped. One or both of the first and second patterns may be arranged in a generally circular array, oval array or other suitable array.

The second spray pattern may be configured to not pass through the first spray pattern. In other words, the streams of water forming the second spray pattern may be configured not to intersect the first spray pattern (e.g., the shape formed by the first spray pattern).

The first spray pattern may have the hyperboloidal shape and the second spray pattern may have either a conical shape or a cylindrical shape. The conical shaped or the cylindrical shaped second spray pattern may be one of a misting spray or an aerated spray.

At least one embodiment relates to a spray head configured to receive water from a supply line. The spray head includes a connecting member and a body. The connecting member is mountable to the supply line to receive the water, and the body is coupled to the connecting member. The body includes a front face, a first plurality of nozzles arranged on the front face in a first array for emitting the water in a first pattern, and a second plurality of nozzles arranged on the front face in a second array for emitting the water in a second pattern. In a first mode of operation (of the spray head), water is emitted from just one of the first plurality of nozzles or the second plurality of nozzles. In a second mode of operation, water is emitted from both the first plurality of nozzles and the second plurality of nozzles with the second pattern passing through the first pattern. At least one of the first and second patterns is hyperboloidal shaped.

Both of the first and second patterns may be hyperboloidal shaped. Both of the first and second arrays may be generally circular (in shape). The first pattern may have a first quasi-focus, the second pattern may have a second quasi-focus, and the first quasi-focus may be offset by a length in a longitudinal direction from the second quasi-focus.

The first pattern may have the hyperboloidal shape, and the second pattern may have either a conical shape or a cylindrical shape. The conical shaped or cylindrical shaped second pattern may be one of a misting spray or an aerated spray.

BRIEF DESCRIPTION OF THE DRAWINGS

FIG. 19 is a perspective view of a hyperboloidal spray pattern, according to yet another exemplary embodiment.

FIG. 20 is a side view of the hyperboloidal spray pattern shown in FIG. 19.

DETAILED DESCRIPTION

Figure 1:
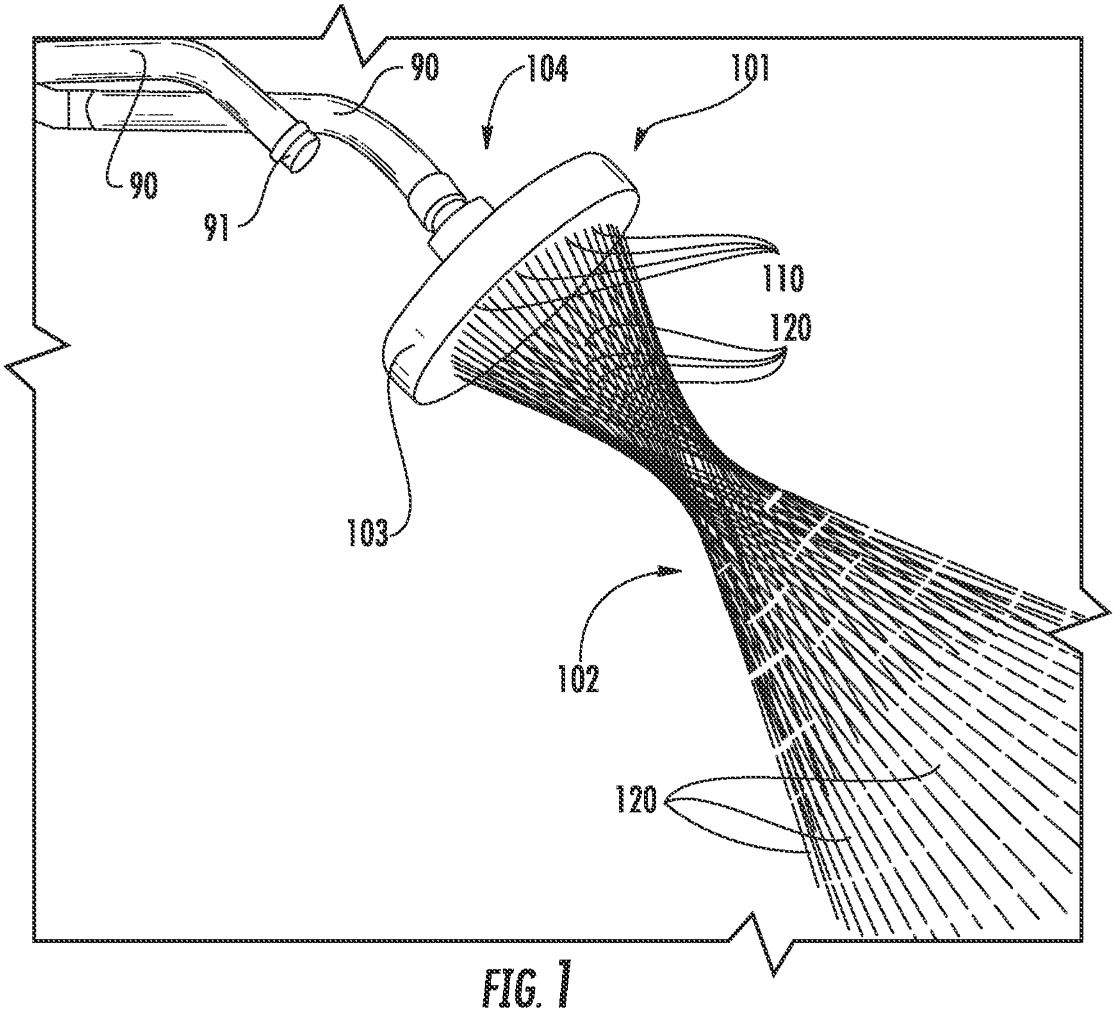
FIG. 1 is a side perspective view of an exemplary embodiment of a showerhead configured to direct a plurality of water streams into a hyperboloidal shape.

Referring generally to the FIGURES, disclosed in this application, are spray heads (e.g., sprayers, showerheads, etc.) for use with showers, faucets, side-sprays, and other spraying devices that are configured to direct a fluid (e.g., water) in one or more spray patterns. The spray heads are configured having a plurality of nozzles that are offset (relative to one another) at an angle (e.g., a rotational angle, compound angle, etc.), such that a plurality of streams of water produced by the plurality of nozzles form a hyperboloidal shaped spray pattern (overall) while maintaining separate streams. For example, each nozzle may be configured at a compound angle relative to a spray face (e.g., a centerline axis, x and y axes, etc.). The term "hyperboloidal" as used herein denotes any generally hyperboloid shape, such as, for example, circular hyperboloids, elliptical hyperboloids, oval hyperboloids, free-form hyperboloids, as well as any other hyperboloid. By way of examples, FIGS. 6-20 disclose various types of hyperboloid spray patterns that are encompassed by the term "hyperboloidal" (as used in describing the shapes of the various spray patterns).

From exiting the nozzle to a quasi-focal point, each stream (e.g., stream of water) of the plurality of streams is configured to converge (e.g., move closer together, move toward one another) without intersecting any other stream of the plurality of streams. Then, from the quasi-focal point outward (e.g., to an object being sprayed), each stream of the plurality of streams diverge (e.g., move farther apart, move away from one another) without intersecting any other stream of the plurality of streams.

The plurality of nozzles of each spray head may be arranged in a generally circular pattern around a face (e.g., spray face) of the spray head, according to one non-limiting example. The nozzles may be arranged such that the spray pattern shape may be circular or non-circular. By way of example, the nozzles may be arranged such that there is an incremental change in the angles of nozzles as the nozzles are arranged around a circular showerhead, such that the impinging spray shape is not circular itself but rather any other desired shape, such as an elliptical, linear, or even a free form shape.

The spray heads disclosed in this application may provide numerous advantages over conventional sprayers. One such advantage is the hyperboloid shape of the spray pattern is aesthetically pleasing. Another such advantage is that the arrangement of the nozzles may be tailored (e.g., fine tuning of the relationship between the nozzle angles) to allow for an impinging spray shape that differs from the shape of the showerhead. Thus, for example, from a simple circular showerhead with clean lines that increases the overall beauty of the bathroom style, a more oval or even human shaped spray could issue (e.g., emit) from the showerhead. This change in shape could increase the efficiency of showering for the user and also reduce water usage by eliminating wasted water from impinging spray shapes that miss the user and hit the walls or curtain within a shower.

The spray heads, as disclosed herein, could advantageously be applied in professional salon spray heads for varying impinging spray shapes for different hair treatment applications or for optimizing hair washing for different parts of customers' scalps, etc. This changing spray pattern may also be used in applications outside of showerheads, such as, for example, spray attachments in sinks where the nozzle arrangement and impinging spray shape could be optimized for washing fruits and vegetables or cleaning a baking pan. Further applications are possible and those discussed in this application are meant to be examples and not limiting in nature.

Figure 2:
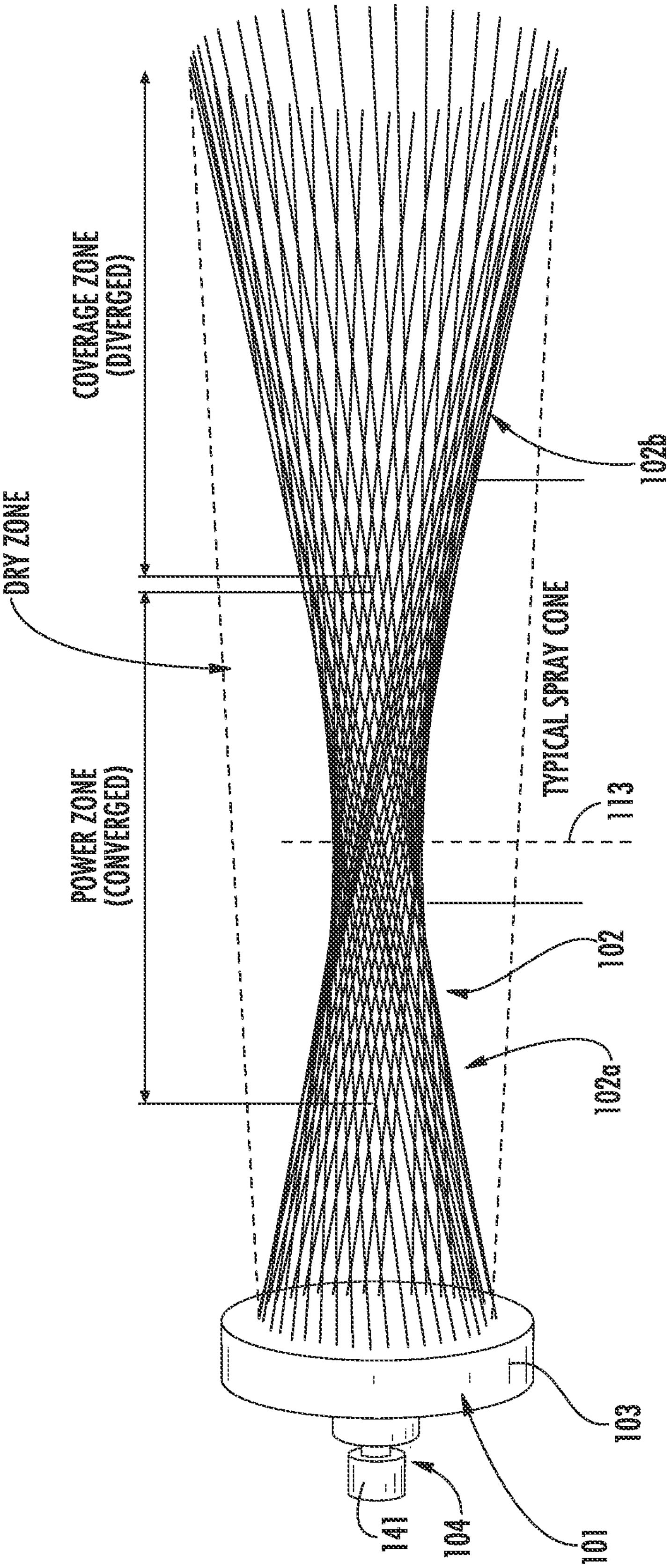
FIG. 2 is another perspective view of the showerhead shown in FIG. 1.

FIGS. 1 and 2 illustrate an exemplary embodiment of a showerhead 101 configured having a plurality of nozzles 110 that are configured to direct a plurality of water streams 120 into a hyperboloidal shaped spray pattern 102. Each nozzle 110 is configured at an angle, such as, for example, at a compound angle relative to a face of the showerhead 101, to direct the fluid stream associated with the nozzle in a converging, non-intersecting manner (compared to the other fluid streams) from the nozzle 110 to a quasi-focus 113 location (discussed below). Having each nozzle 110 configured with this compound angle creates the hyperboloidal shaped spray pattern 102.

The showerhead 101 includes a casing 103 (e.g., body) having an inlet 104 configured to receive a supply of water from a source. The showerhead 101 may be configured as a fixed showerhead 101 in that a base (e.g., inlet) of the showerhead is fixedly coupled to another object (although the showerhead may be pivotally and/or rotatably coupled to the base to adjust the relative alignment of the nozzles). As shown in FIG. 1, the inlet 104 is connected (e.g., fixedly connected) to a water line 90 that is configured to carry a supply of water. For example, the inlet 104 may be configured having threads that thread to mating threads on the water line 90 to connect the showerhead to the water line. As shown in FIG. 2, the inlet 104 may include a sleeve 141 having internal threads that are configured to thread to external threads of a fitting 91 (FIG. 1) on an end of a water line 90.

Figures 3A, 3B, 3C:
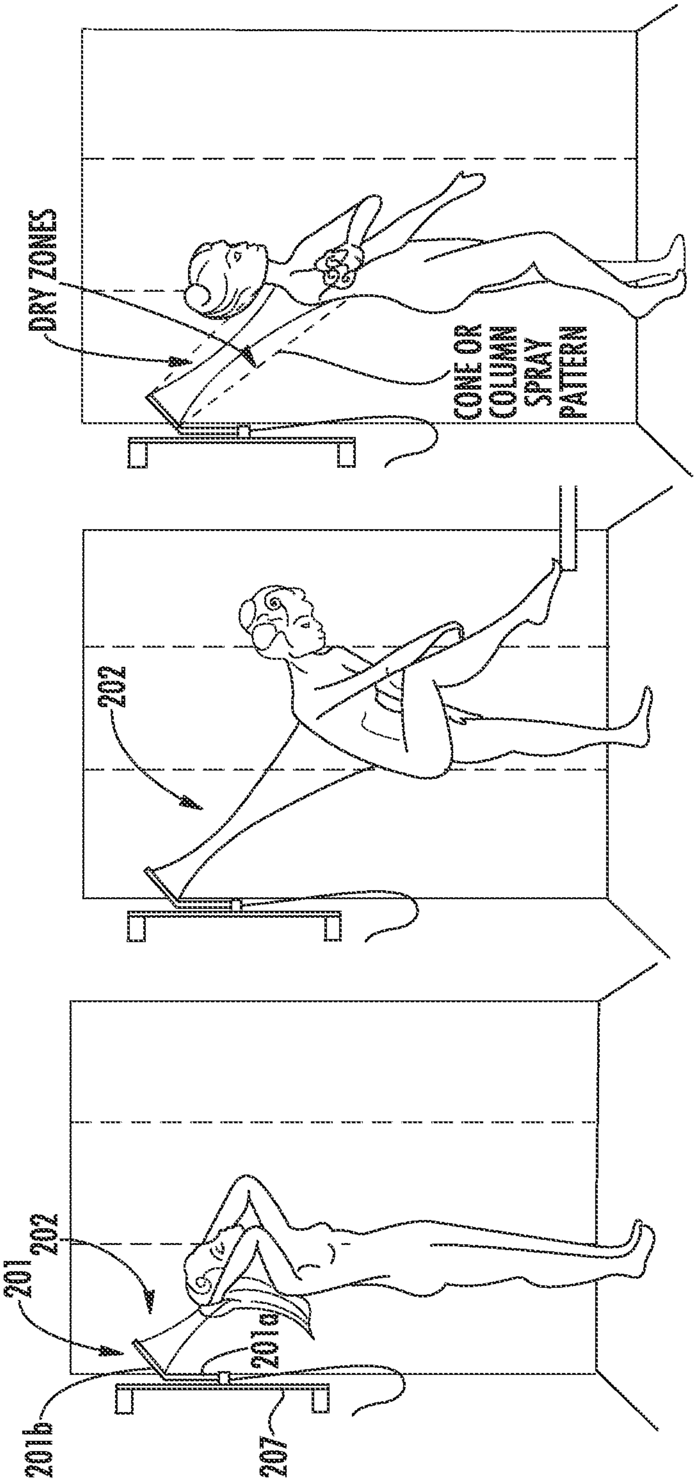
FIG. 3A is a perspective view of a person using a showerhead, according to this application.
FIG. 3B is another perspective view of the person using the showerhead shown in FIG. 3A.
FIG. 3C is another perspective view of the person using the showerhead shown in FIG. 3A.

The showerhead may also be a movable device, such as a movable handset shower 201 shown in FIGS. 3A-3C. The movable handset shower 201 includes a base 201*a* and a spray head 201*b* (e.g., spray face). The base 201*a* is configured to detachably couple to a support 207, which may be fixed to a shower wall for example, such that when the base 201*a* is decoupled, the handset shower 201 can be moved to direct the spray pattern 202 elsewhere (e.g., a person's legs). As shown, the spray pattern 202 has a hyperboloid shape.

The showerhead 101 may also include a valve (e.g., a flow control valve, a mixing valve, etc.) that is configured to control the flow of water through the showerhead 101. The valve of the showerhead 101 may be disposed within the casing 103. The showerhead 101 may include other elements/components, such as, for example, an actuator configured to allow a user to control operation of the valve. By way of example, the actuator may be configured to control a flow rate and/or a temperature of the water emitted from the showerhead 101.

As shown in FIG. 2, the hyperboloid shaped spray pattern 102 includes a first portion 102*a* and a second portion 102*b*. The first portion 102*a* extends from the nozzles 110 (e.g., the location at which the stream of water leaves the showerhead 101) to a quasi-focus 113 (e.g., quasi-focal point, etc.). The term "quasi-focus" as used herein denotes the part of the spray pattern having the smallest size (e.g., cross-sectional area). The "focus" (e.g., focal-point) from an optics or geometric standpoint typically refers to a location where rays (e.g., of light) converge and intersect. For example, a conical shape has an apex (e.g., focus, vertex) that refers to the point that the locus of straight lines converge and intersect. In this application, the hyperboloidal shaped spray patterns are configured such that the plurality of streams converge without intersecting one another up to the quasi-focus location and, therefore, the term "quasi-focus" is used (instead of the term "focus"). In the first portion 102*a*, each stream of water 120 is configured to converge without intersecting any other stream of water 120.

The spray pattern 102 may have a shape (e.g., cross-sectional shape) at the quasi-focus 113 that is an annular array of separated fluid streams. For example, each fluid stream 120 of the spray pattern 102 may be located at an approximately common (e.g., equal) radial distance (e.g., radius) from a common center point (shared by all of the fluid streams), and each fluid stream 120 may be spaced apart from each adjacent fluid stream by a common radial angle (e.g., angular distance). At the quasi-focus 113, each pair of adjacent fluid streams 120 will be at their closest relative position to one another (i.e., have the shortest spacing or separation distance between them). The overall size (e.g., diameter) of the array of separated fluid streams at the quasi-focus 113 will also influence the spacing/separation between each pair of adjacent fluid streams 120.

The location of the quasi-focus (e.g., the distance from the spray head to the location of the quasi-focus of the spray pattern) can be tailored to the specific application of the spray head. By way of example, a distance from the nozzles of the showerhead 101 to the quasi-focus 113, which is a length of the first portion 102*a*, is in the range of 7-9 inches. However, the length of the first portion 102*a* of the spray pattern can be changed, such as by designing the quasi-focus 113 to be farther from the showerhead 101, and/or varied, such as by increasing the flow rate and/or velocity of water flowing through the showerhead.

The second portion 102*b* extends from the quasi-focus 113 location away from the showerhead 101, such as until impinging an object (e.g., a person in the shower). In the second portion 102*b*, each stream of water 120 is configured to diverge without intersecting any other stream of water 120. By way of example, for the example shown in FIG. 2, as the plurality of fluid streams move away from the quasi-focus 113, the shape of the spray pattern is an annular array of separated fluid streams having an increasing radius and, therefore, an increasing spacing of separation between adjacent fluid streams.

Each hyperboloid spray pattern may advantageously include (or provide) a power zone. As shown in FIG. 2, the power zone is where the plurality of fluid streams 120 have converged to a degree to influence the pressure imparted by the fluid streams to provide a more effective rinse (e.g., wash, etc.) for the object being sprayed. By way of example, the power zone may be provided over a range (plus and minus) of distance that overlaps with the quasi-focus location. As shown in FIG. 2, the power zone is approximately in the range of plus and minus four inches (+/−4") from the quasi-focus 113 location in both directions (e.g., upstream direction and downstream direction). The most power (e.g., pressure from the fluid streams) will be provided at the quasi-focus location. As shown in FIG. 3A, the power zone of the spray pattern 102, 202 may advantageously provide a stronger rinse for a person rinsing shampoo or conditioner (as examples) from their hair. Moreover, the water may provide a stronger rinse by not having the fluid streams of water intersect one another, since each fluid stream will not lose energy due to collisions with other fluid streams.

Each hyperboloid spray pattern advantageously include (or provide) a coverage zone. As shown in FIG. 2, the coverage zone is where the plurality of fluid streams 120 have diverged to a degree to provide sufficient coverage, such as, for example, to keep a person showering from becoming cold due to a lack of coverage from the sprayed water. By way of example, the coverage zone may be provided by a minimum distance from the quasi-focus location in a direction away from the quasi-focus location. As shown in FIG. 2, the coverage zone begins approximately where the power zone ends (e.g., four inches (4") downstream from the quasi-focus 113 location) and continues downstream until impinging on an object (e.g., person). As shown in FIG. 3B, the coverage zone may advantageously increase coverage of, for example, a lady in the shower to ensure that she does not become cold when shaving her legs. The coverage zone of the spray pattern 102, 202 provides rinsing over a larger area of a person showering.

The spray pattern having a hyperboloidal shape also provides a dry-zone. As shown in FIGS. 2 and 3C, the dry zone is the area between an outer periphery of the spray pattern 102, 202 and the location where a cone/column spray pattern would be located. Thus, the fluid streams of the spray patterns 102, 202 do not pass through the dry zone, whereas fluid streams from other shaped spray patterns would pass through the dry zone. The dry zone advantageously allows, for example, a person who does not want to get their hair wet to shower more easily without getting their hair wet.

As FIGS. 2-3C illustrate, the showerhead (e.g., spray head) that provides a spray pattern of water having a hyperboloid shape advantageously provides a power zone, a coverage zone, and a dry-zone. These zones could also be advantageous for other types of spray heads, such as faucets or side sprays. For example, the power zone may help remove food that has been dried on (e.g., stuck on, etc.) dishes, such as pots and pans, more effectively.

Figure 4:
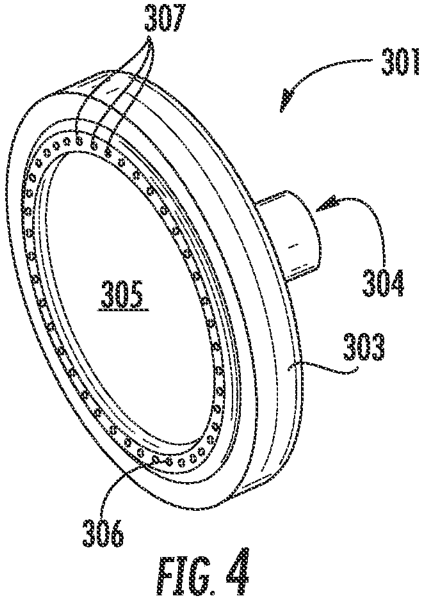
FIG. 4 is a perspective view of an exemplary embodiment of a showerhead configured to direct a plurality of water streams into a hyperboloidal shape.
Figure 4A:
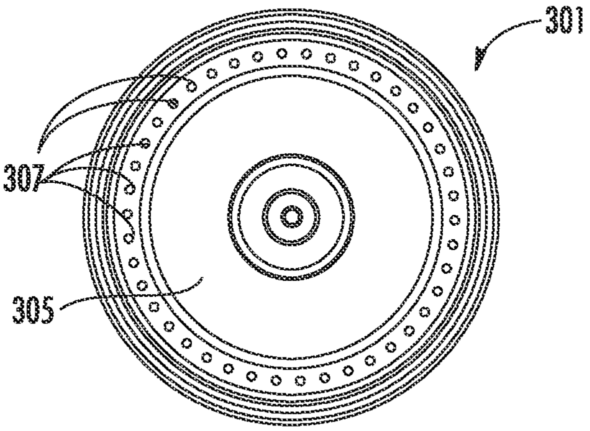
FIG. 4A is a front view of the showerhead shown in FIG. 4.
Figure 4B:
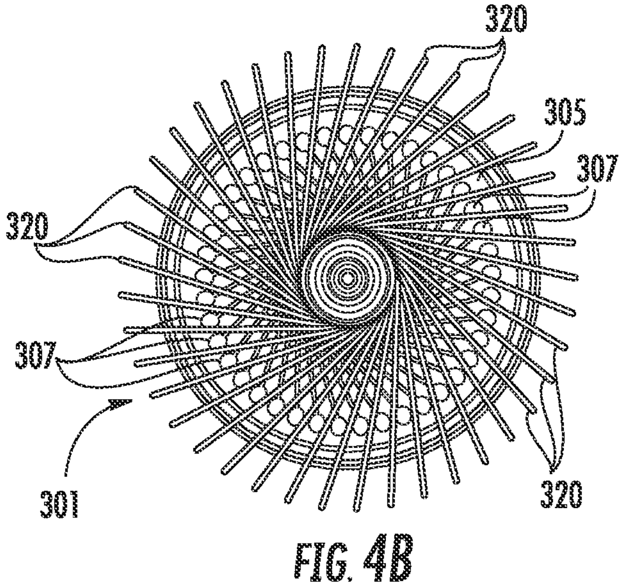
FIG. 4B is a front view of the showerhead shown in FIG. 4, with streams of water being emitted from the nozzles.
Figure 4C:
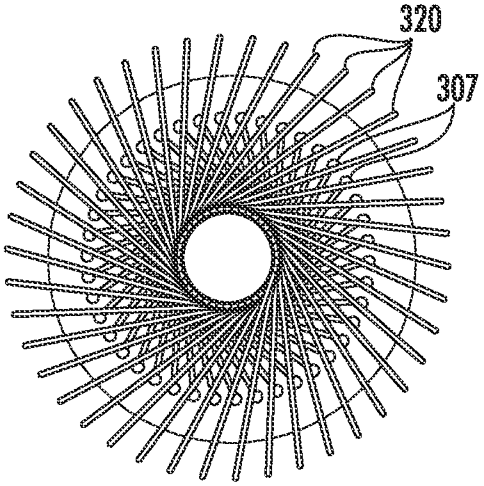
FIG. 4C is another front view of the showerhead shown in FIG. 4, with streams of water being emitted from the nozzles.

FIGS. 4-4C illustrate an exemplary embodiment of a showerhead 301 that includes a body 303 (e.g., housing, casing, etc.) and a connecting member 304 extending from a backside of the body 303 and having an inlet configured to receive a supply of water from a source. The body 303 includes a front face 305 that is configured to face toward the object being sprayed (e.g., a person). As shown in FIG. 4, the front face 305 is generally planar. The showerhead 301 may include an annular member 306 that protrudes forward from the front face 305 and includes a plurality of nozzles 307 arranged in a circular array. The plurality of nozzles 307 are configured to emit the plurality of streams of water 320 into a hyperboloidal shaped spray pattern, as shown in FIGS. 4B and 4C. FIG. 4B shows a front plan view of the front face 305 in a line-mode without surface shading (i.e., a wire-frame) for clarity. FIG. 4C shows the same front plan view of the front face 305 with surface shading. As shown in FIG. 4A, the showerhead 301 is shown in the same front plan view of the front face 305, without the plurality of streams of water 320 being emitted.

Figure 5:
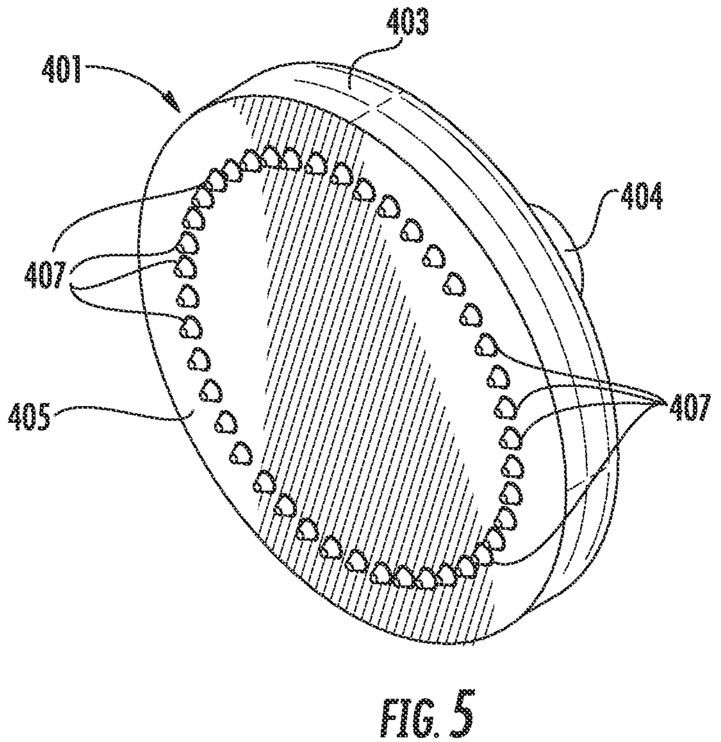
FIG. 5 is a perspective view of an exemplary embodiment of a showerhead configured to direct a plurality of water streams into a hyperboloidal shape.
Figure 5A:
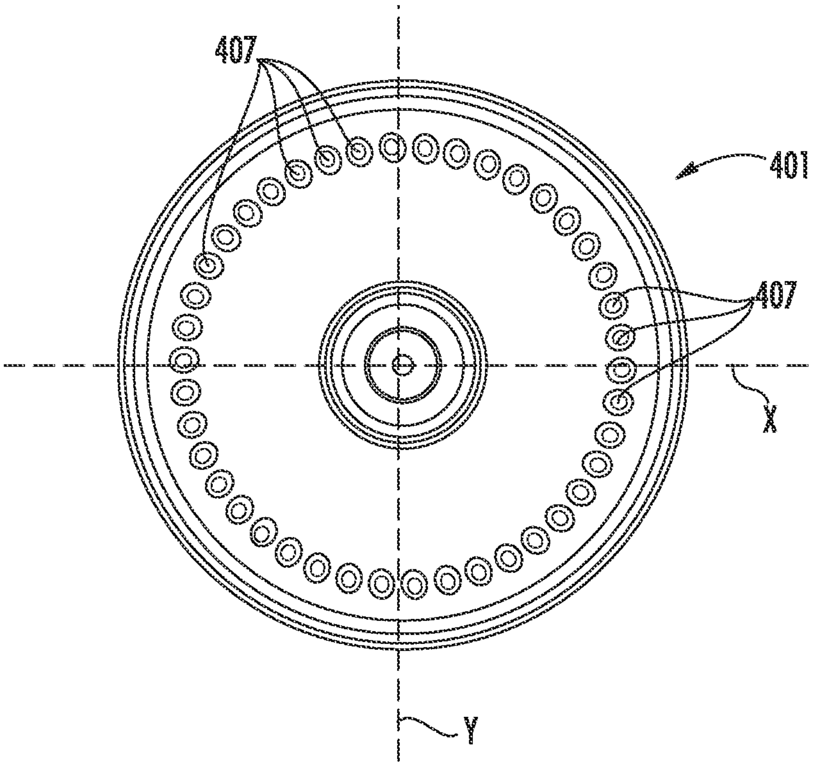
FIG. 5A is a front view of the showerhead shown in FIG. 5.
Figure 5B:
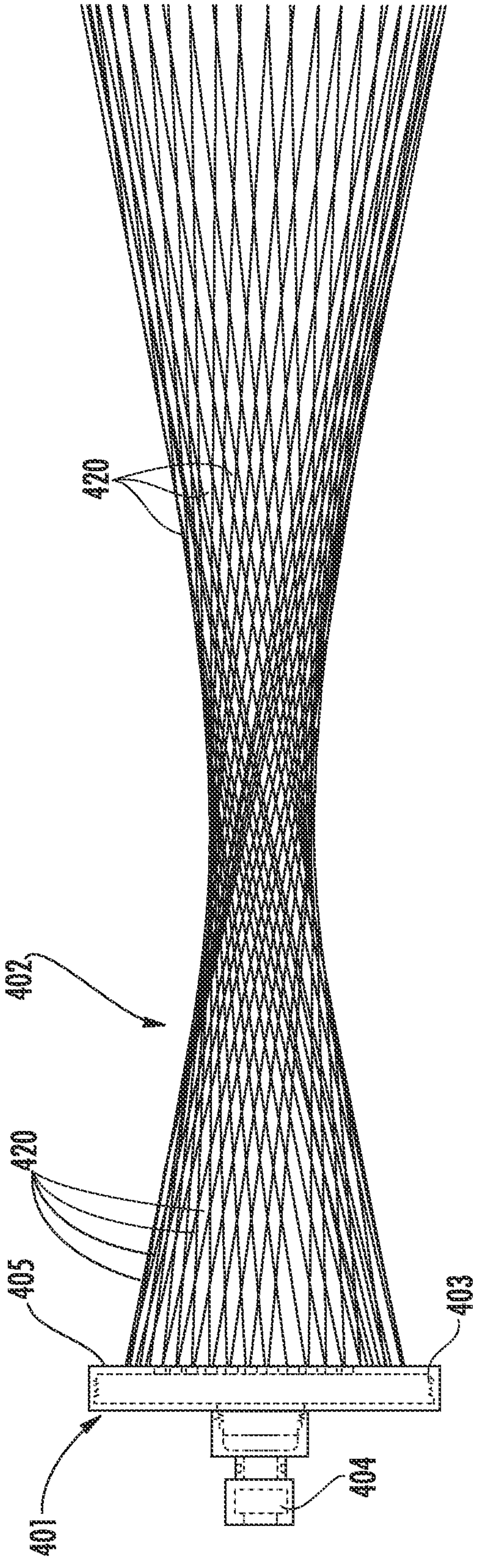
FIG. 5B is a side view of the showerhead shown in FIG. 5, with streams of water being emitted from the nozzles.

FIGS. 5-5B illustrate another exemplary embodiment of a showerhead 401 that includes a body 403 and a connecting member 404 extending from a backside of the body 403 and having an inlet configured to receive a supply of water from a source. The body 403 includes a front face 405 that is configured to face toward the object being sprayed (e.g., a person). The front face 405 is shown in FIG. 5 to be generally planar. However, the front face 405 may be a non-planar element (e.g., surface). A plurality of nozzles 407 are arranged in a circular array on the front face 405 of the body 403. As shown best in FIG. 5, each nozzle 407 of the plurality of nozzles 407 extends outwardly from the front face 405 and is configured to emit a stream of water 420. The plurality of streams of water 420 from a hyperboloidal shaped spray pattern 402, as shown in FIG. 5B. Each nozzle 407 may be configured at an angle relative to the front face 405. According to one exemplary embodiment, each nozzle 407 of the plurality of nozzles is aligned at a compound angle relative to the generally planar front face 405 of the body 403. By way of example, each nozzle 407 may be configured at a first angle relative to an x-axis and a second angle relative to a y-axis (see FIG. 5A). According to one example, each of the first and second angles is an acute angle.

The nozzles of the various spray heads and/or showerheads may be recessed into a spray face (e.g., front face) or other suitable element of the device, may protrude (e.g., extend) from a spray face or other suitable element of the device, or may have other suitable arrangements that provide a hyperboloidal shaped spray pattern.

FIGS. 6-20 illustrate various non-limiting examples of hyperboloidal shaped spray patterns that are producible by the spray heads described herein. It is noted that other hyperboloidal shaped spray patterns may be produced by the spray heads of this application and the spray patterns disclosed herein are exemplary in nature.

Figure 6:
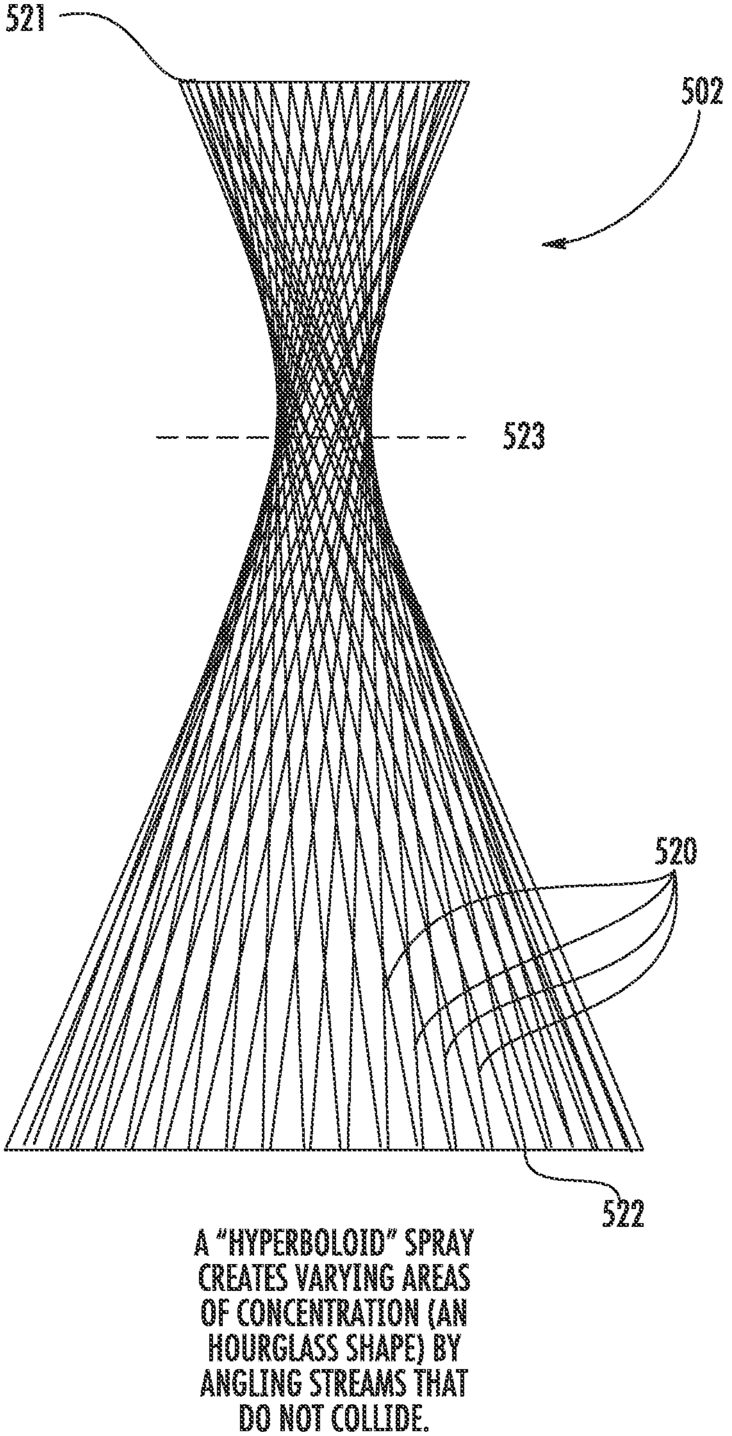
FIG. 6 is a side view of a hyperboloidal spray pattern, according to an exemplary embodiment.
Figure 7:
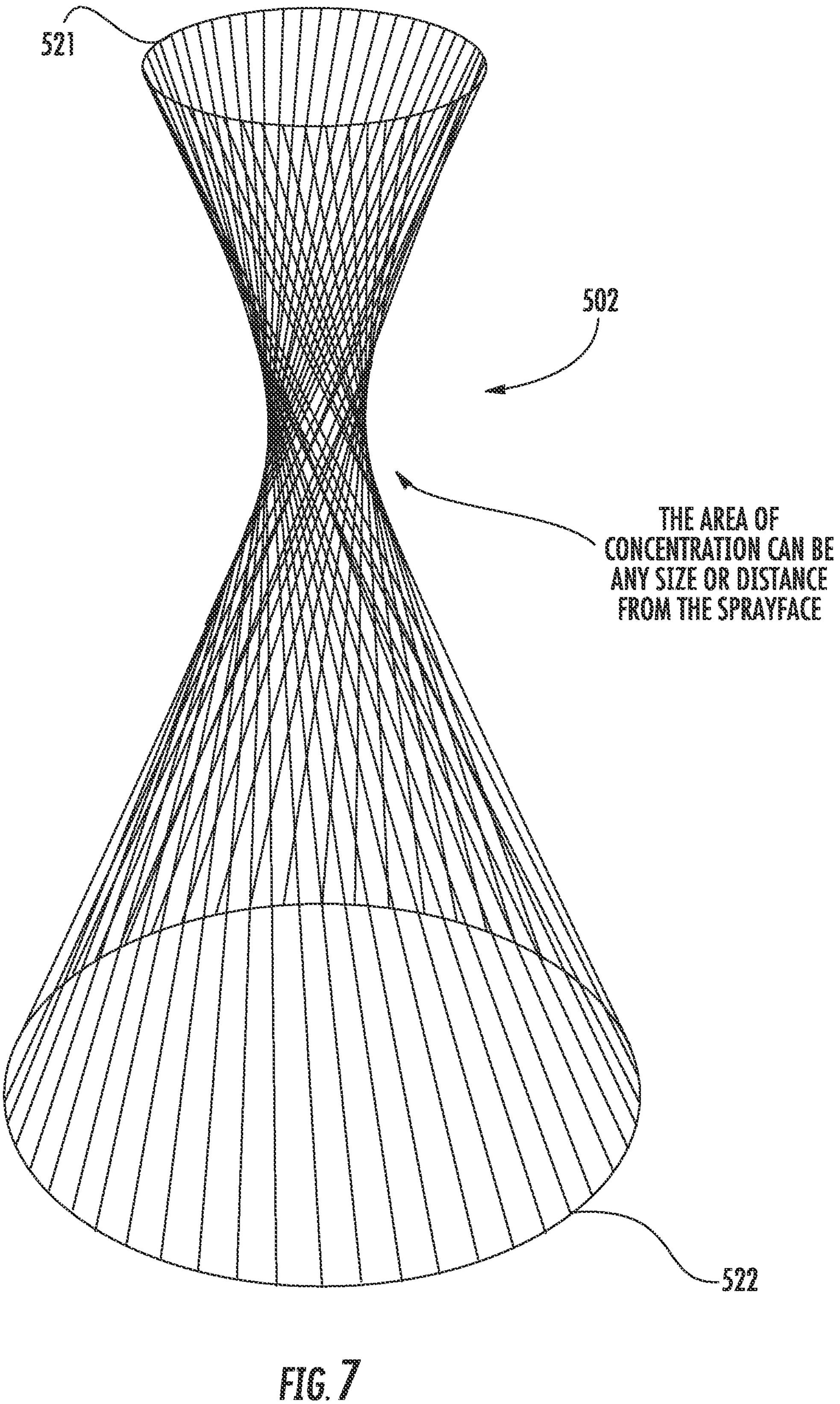
FIG. 7 is a perspective view of the hyperboloidal spray pattern shown in FIG. 6.

FIGS. 6 and 7 illustrate an example of a circular hyperboloid spray pattern 502. The circular hyperboloid spray pattern 502 has a generally hourglass shape when viewed from a side. The circular hyperboloid spray pattern 502 is formed by a plurality of angled (e.g., at compound angles) streams of fluid (e.g., water) that are emitted from a plurality of nozzles at an exit end 521 of the spray pattern 502. Each stream 520 continues without colliding (e.g., intersecting) any other stream 520 of the plurality of streams, until the stream 520 impinges upon on an object at an impinging end 522 of the spray pattern 502. As shown, the impinging end 522 of the spray pattern 502 has a generally circular shape. Located between the exit end 521 and the impinging end 522 is a quasi-focus location 523 corresponding to the location at which the streams 520 are most focused (e.g., concentrated). The area (e.g., cross-sectional area) at the quasi-focus location 523 can be any size and/or any distance away from the exit end 521 of the spray pattern 502.

As shown best in FIG. 7, the fluid streams 520 have a circular shape at the exit end 521 of the spray pattern 502. Thus, the plurality of nozzles (e.g., of the showerhead, of the spray head, etc.) may be arranged having a circular array. Also shown, the fluid streams 520 are configured to have a circular shape at the impinging end 522 of the spray pattern 502.

Figure 8:
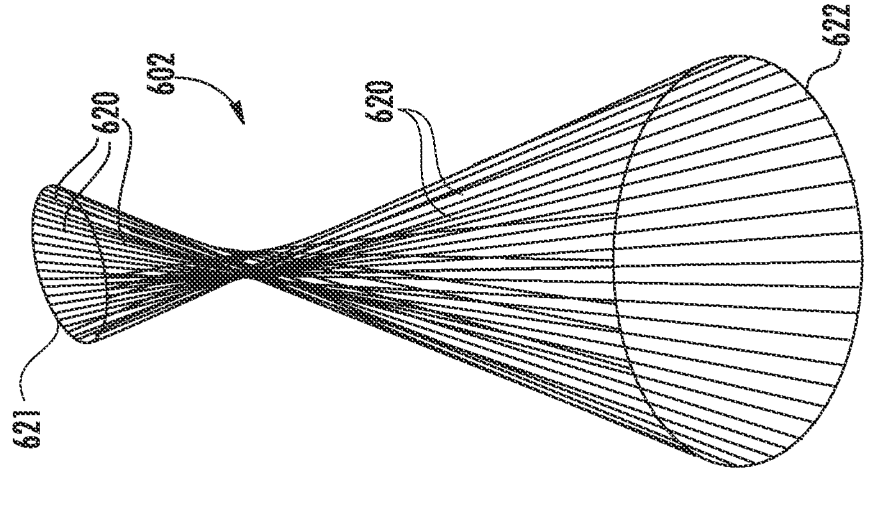
FIG. 8 is a perspective view of a hyperboloidal spray pattern, according to another exemplary embodiment.

FIG. 8 illustrates another example of a hyperboloid spray pattern 602 formed by a plurality of fluid streams 620. The spray pattern 602 has a first end 621 (e.g., exit end from the nozzles) and a second end 622 (e.g., impinging end). As shown, the fluid streams 620 have an oval (e.g., elliptical) shape at the first end 621 of the spray pattern 602, and the fluid streams 620 have a circular shape at the second end 622 of the spray pattern 602. Thus, the plurality of nozzles may be arranged in an oval shaped array around a spray head, yet configured (e.g., at compound angles) to direct water to form a circular shaped spray pattern, such as beyond a quasi-focus location.

Figure 9:
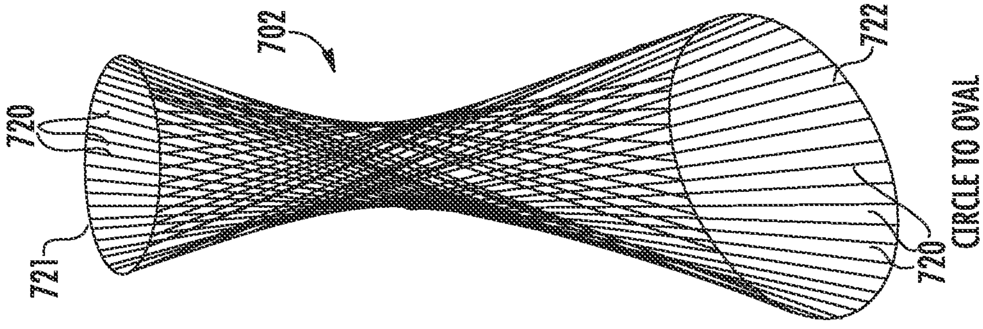
FIG. 9 is a perspective view of a hyperboloidal spray pattern, according to another exemplary embodiment.

FIG. 9 illustrates another example of a hyperboloid spray pattern 702 formed by a plurality of fluid streams 720. The spray pattern 702 has a first end 721 (e.g., exit end from the nozzles) and a second end 722 (e.g., impinging end). As shown, the fluid streams 720 have a circular shape at the first end 721 of the spray pattern 702, and the fluid streams 720 have an oval (e.g., elliptical) shape at the second end 722 of the spray pattern 702. Thus, the plurality of nozzles may be arranged in a circular shaped array around a spray head, yet configured (e.g., at compound angles) to direct water to form an oval shaped spray pattern, such as beyond a quasi-focus location.

Figure 10:
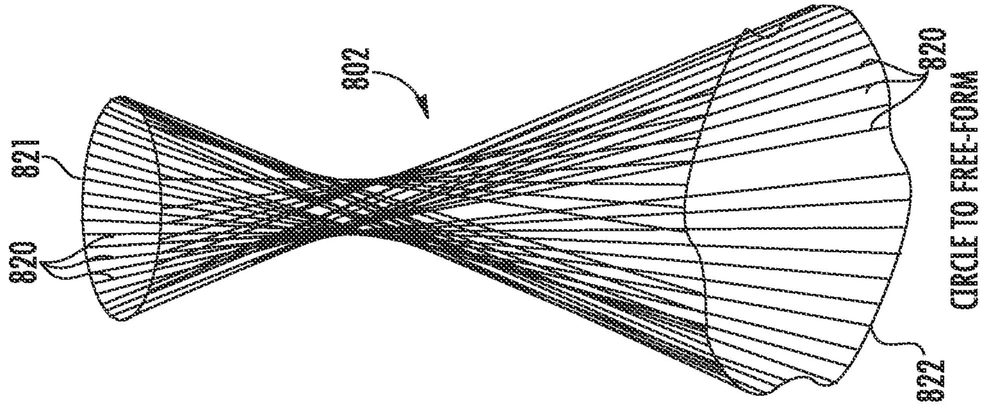
FIG. 10 is a perspective view of a hyperboloidal spray pattern, according to another exemplary embodiment.

FIG. 10 illustrates another example of a hyperboloidal spray pattern 802 formed by a plurality of fluid streams 820. The spray pattern 802 has a first end 821 (e.g., exit end from the nozzles) and a second end 822 (e.g., impinging end). The fluid streams 820 are configured having a first shape (e.g., circular, oval, etc.) at the first end 821 of the spray pattern 802 and a second shape (e.g., freeform) at the second end 822 of the spray pattern 802 that is different than the first shape at the first end 821. As shown, the first shape is circular and the second shape is a freeform shape (e.g., any tailored/unique shape). Thus, the plurality of nozzles may be arranged in a circular shaped array around a spray head, yet configured (e.g., at compound angles) to direct water to form a uniquely shaped spray pattern, such as beyond a quasi-focus location.

The spray heads disclosed in this application may also be configured to provide more than one spray pattern, either simultaneously or alternatively, such as through one or more actuators to control the spray function(s) of the spray head. FIGS. 11-20 illustrate various non-limiting examples of multiple spray patterns that may be provided by the spray heads, showerheads, and other spraying devices of this application. As indicated, other multi-spray configurations may be provided by the spray heads, showerheads, and other spraying devices of this application.

Figure 12:
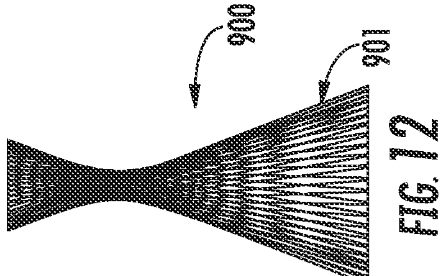
FIG. 12 is a side view of the hyperboloidal spray pattern shown in FIG. 11.
Figure 11:
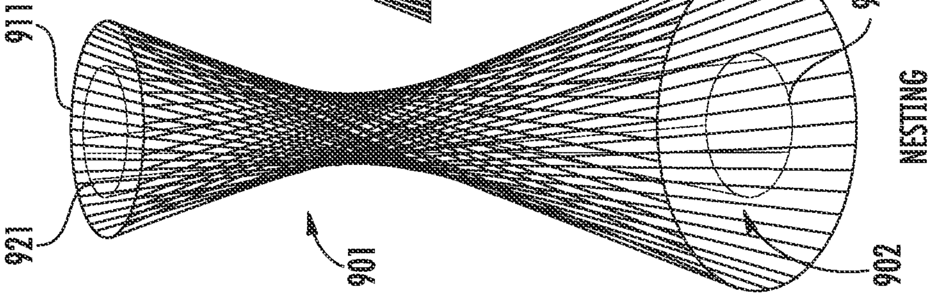
FIG. 11 is a perspective view of a hyperboloidal spray pattern, according to another exemplary embodiment.

FIGS. 11 and 12 illustrate an exemplary embodiment of a multi-spray pattern 900 that includes a first spray pattern 901 and a second spray pattern 902 nested within the first spray pattern 901. As shown, the first spray pattern 901 has a hyperboloidal shape, and the second spray pattern 902 has a hyperboloidal shape that is different than the first spray pattern 901. For example, a size (e.g., diameter, major diameter, minor diameter, etc.) of the first end 911 of the first spray pattern 901 may be larger than a size of the first end 921 of the second spray pattern 902. For example, a spray head may include a first array of nozzles having a generally circular configuration with a first radius and a second array of nozzles having a generally circular configuration with a second radius that is smaller than the first radius, such that second array of nozzles are provided within the first array of nozzles. Also for example, a size (e.g., diameter, major diameter, minor diameter, etc.) of the second end 912 of the first spray pattern 901 may be larger than a size of the second end 922 of the second spray pattern 902. In this way, when both spray patterns are being emitted at the same time, the second end 922 of the second spray pattern is nested within the second end 912 of the first spray pattern 901.

Each of the first and second spray patterns 901, 902 include a quasi-focus location. Each quasi-focus location can be located such that the second spray pattern 902 does not intersect with the first spray pattern 901. The quasi-focus location of the second spray pattern 902 may be located at the same location as the quasi-focus of the first spray pattern 901. However, the quasi-focus of the second spray pattern 902 can have a different location relative to the quasi-focus of the first spray pattern 901, without the fluid streams of each spray pattern colliding with fluid streams from the other spray pattern. Thus, each fluid stream of the second spray pattern 902 may be configured to not collide (e.g., not intersect) with any fluid stream of the first spray pattern 901 and/or any other fluid stream of the second spray pattern 902, and each fluid stream of the first spray pattern 901 may be configured to not collide with any fluid stream of the second spray pattern 902 and/or any other fluid stream of the first spray pattern 901.

Figure 14:
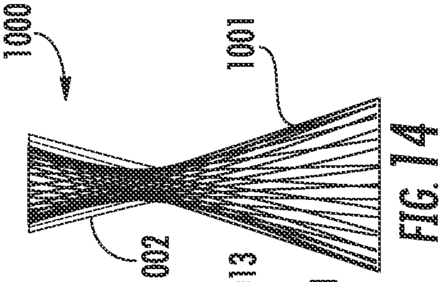
FIG. 14 is a side view of the hyperboloidal spray pattern shown in FIG. 13.
Figure 13:
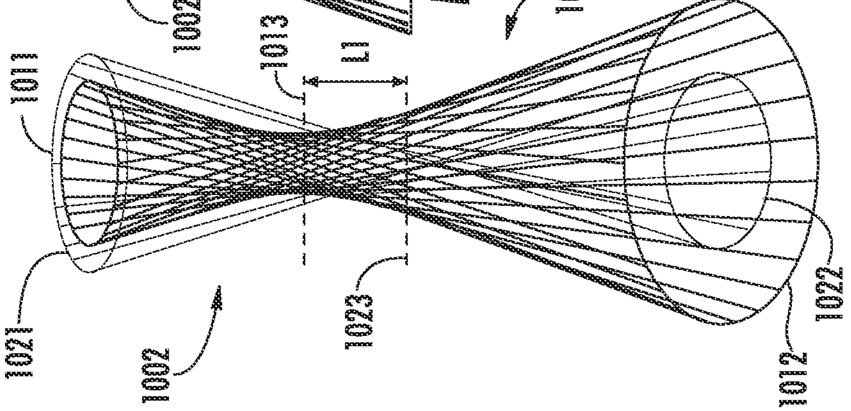
FIG. 13 is a perspective view of a hyperboloidal spray pattern, according to another exemplary embodiment.

FIGS. 13 and 14 illustrate an exemplary embodiment of a multi-spray pattern 1000 that includes a first spray pattern 1001 and a second spray pattern 1002 that is configured to pass through the first spray pattern 1001. The first spray pattern 1001 has a hyperboloidal shape that extends between a first end 1011 and a second end 1012, and includes a quasi-focus 1013 located between the first and second ends 1011, 1012. The second spray pattern 1002 has a hyperboloidal shape that extends between a first end 1021 and a second end 1022, and includes a quasi-focus 1023 located between the first and second ends 1021, 1022.

As shown in FIG. 13, the location of the quasi-focus 1013 of the first spray pattern 1001 is offset by a length L1 from the location of the quasi-focus 1023 of the second spray pattern 1002 in a direction/distance away from the first ends 1011, 1021 corresponding to where the fluid streams are configured to leave the respective nozzles of a spray head. This offset length L1 combined with a difference in size between the first and second spray patterns 1001, 1002 creates a pass through between the spray patterns where fluid streams intersect (e.g., collide). For example, one or more fluid streams of the first spray pattern 1001 may collide with one or more fluid streams of the second spray pattern 1002, without colliding with any other fluid stream of the first spray pattern 1001. Similarly, one or more fluid streams of the second spray pattern 1002 may collide with one or more fluid streams of the first spray pattern 1001, without colliding with any other fluid stream of the second spray pattern 1002. The difference in size between the first and second spray patterns 1001, 1002 may be due to the location and/or the alignment of the nozzles emitting the fluid streams. For example, the first end 1011 of the first spray pattern 1001 may have a larger diameter than that of the first end 1021 of the second spray pattern 1002. Also for example, the nozzles that form the first spray pattern 1001 may be aligned at different angles than the nozzles that form the second spray pattern 1002.

Figure 16:
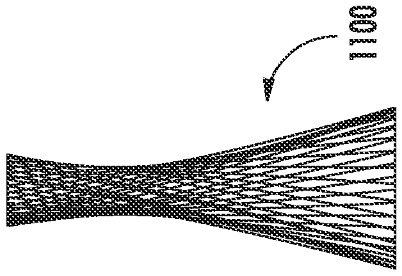
FIG. 16 is a side view of the hyperboloidal spray pattern shown in FIG. 15.
Figure 15:
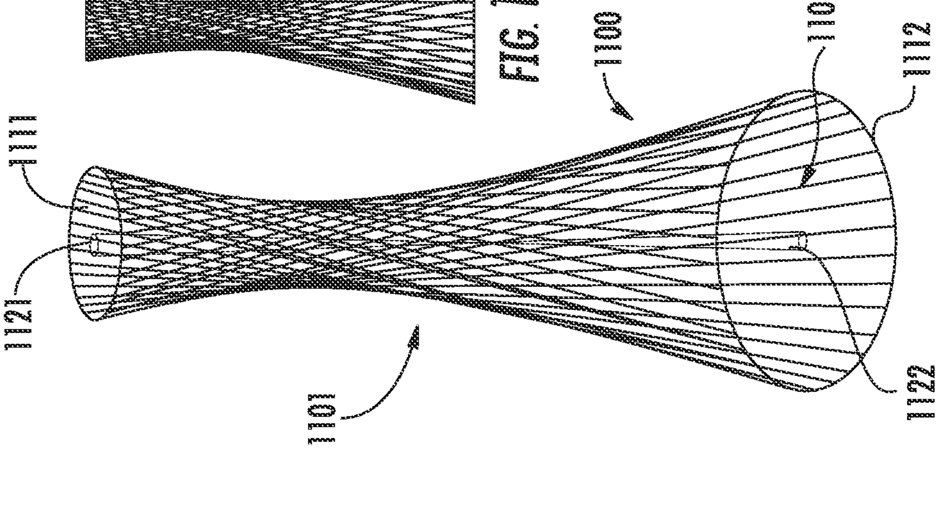
FIG. 15 is a perspective view of a hyperboloidal spray pattern, according to another exemplary embodiment.

FIGS. 15 and 16 illustrate another exemplary embodiment of a multi-spray pattern 1100 that includes a first spray pattern 1101 and a second spray pattern 1102 that is confined within the first spray pattern 1101. As shown, the first spray pattern 1101 has a hyperboloidal shape that extends between a first end 1111 and a second end 1112, and includes a quasi-focus located between the first and second ends 1111, 1112. Also shown, the second spray pattern 1102 has a cylindrical (e.g., column) shape that extends between a first end 1121 and a second end 1122 with a generally uniform cross-sectional size. The second spray pattern 1102 can have a varying cross-sectional size, such as increasing or decreasing when moving from the first end 1121 to the second end 1122. Each stream of fluid (e.g., water) from the first spray pattern 1101 may be configured not to collide with any other fluid stream of the first spray pattern 1101 and/or any other fluid stream of the second spray pattern 1102. Each fluid stream of the second spray pattern 1102 may be configured not to collide with any other fluid stream of the second spray pattern 1102 and/or any fluid stream of the first spray pattern 1101. The fluid streams of the second spray pattern 1102 may be configured to collide, according to other examples.

Figure 18:
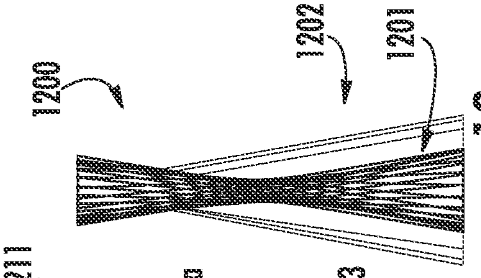
FIG. 18 is a side view of the hyperboloidal spray pattern shown in FIG. 17.
Figure 17:
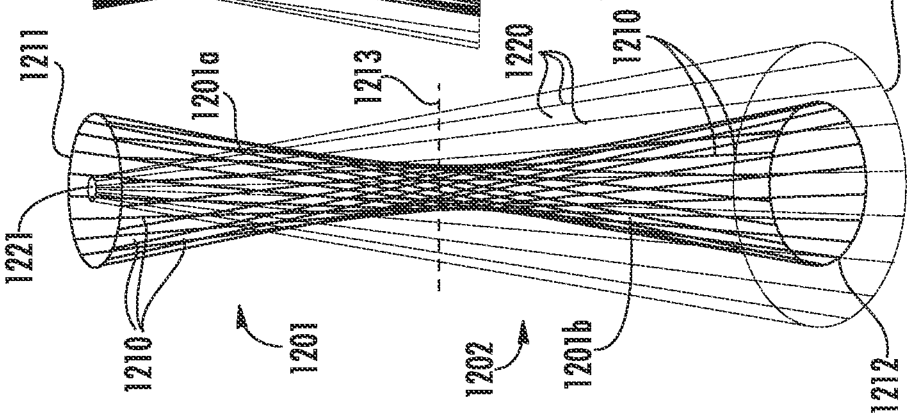
FIG. 17 is a perspective view of a hyperboloidal spray pattern, according to another exemplary embodiment.

FIGS. 17 and 18 illustrate an exemplary embodiment of a multi-spray pattern 1200 that includes a first spray pattern 1201 and a second spray pattern 1202 that are configured to pass through one another. The first spray pattern 1201 includes a plurality of fluid streams 1210 (e.g., provided by a first plurality of nozzles). The second spray pattern 1202 includes a plurality of fluid streams 1220 (e.g., provided by a second plurality of nozzles). The first spray pattern 1201 has a hyperboloidal shape that extends between a first end 1211 and a second end 1212, and includes a quasi-focus 1213 located between the first and second ends 1211, 1212. The second spray pattern 1202 has a generally conical (e.g., conical, frusto-conical, etc.) shape that extends between a first end 1221 and a second end 1222.

As shown best in FIG. 13, the size (e.g., cross-sectional size) of the second spray pattern 1202 increases when moving from the first end 1221 to the second end 1222. The size of the first end 1221 of the second spray pattern 1202 is smaller than the size of the first end 1211 of the first spray pattern 1201, and the size of the second end 1222 of the second spray pattern 1202 is larger than the size of the second end 1212 of the first spray pattern, such that the fluid streams of the two spray patterns 1201, 1202 pass through one another at an intersection location provided between the first and second ends. Thus, the streams of fluid (e.g., water) of the second spray pattern 1202 pass through the streams of fluid of the first spray pattern 1201. The length of the quasi-focus 1213 alone or in combination with a difference in the pitch (e.g., angle) of the fluid streams 1210 and the fluid streams 1220, determines the location at which the fluid streams 1220 pass through the fluid streams 1210. For example, the fluid streams 1210, 1220 may cross (e.g., intersect) at a location that is in a first portion 1201*a* of the first spray pattern, where the first portion 1201*a* is located between the first end 1211 and the quasi-focus 1213. Also for example, the fluid streams 1210, 1220 may cross at a location that is in a second portion 1201*b* of the first spray pattern 1201, where the second portion 1201*b* is located between the quasi-focus 1213 and the second end 1212. Where the fluid streams cross one another, each fluid stream 1220 may collide with one or more of the fluid streams 1210; however, each fluid stream 1220 of the second spray pattern 1202 does not collide with any other of the fluid streams 1220 of the second spray pattern. Similarly, where the fluid streams cross one another, each fluid stream 1210 may collide with one or more of the fluid streams 1220; however, each fluid stream 1210 of the first spray pattern 1201 does not collide with any other of the fluid streams 1210 of the first spray pattern.

FIGS. 19 and 20 illustrate another exemplary embodiment of a multi-spray pattern 1300 that includes a first spray pattern 1301 and a second spray pattern 1302 that is configured to be confined within the first spray pattern 1301. The first spray pattern 1301 has a hyperboloidal shape that extends between a first end 1311 and a second end 1312, and includes a quasi-focus located between the first and second ends 1311, 1312. The second spray pattern 1302 may be in the form of a misting spray, an aerated spray, a messaging spray, a moving spray, or any other suitable form of spray. The shape of the second spray pattern 1302 may be generally cylindrically shaped, such as in a column that extends between a first end 1321 and a second end 1322. The second spray pattern 1302 may have a generally uniform cross-sectional size or may vary in size along a length of the pattern.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members and/or any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the spray heads, showerheads, and other spraying devices, as shown in the exemplary embodiments, are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., casing, nozzle, spray pattern, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A spray head, comprising:

a first plurality of nozzles for emitting water in a first spray pattern; and a second plurality of nozzles for emitting the water in a second spray pattern, wherein in at least one mode of operation, the water is emitted from both the first plurality of nozzles and the second plurality of nozzles with the second spray pattern being at least partially encompassed within the first spray pattern; and, wherein at least one of the first spray pattern or the second spray pattern is a hyperboloidal shape, the first plurality of nozzles are angled radially inward toward a central axis of the spray head, and the second plurality of nozzles are angled radially outward away from the central axis.

2. The spray head of claim 1, wherein the first plurality of nozzles are angled to direct the water leaving the first plurality of nozzles toward the second spray pattern.

3. The spray head of claim 1, wherein the first plurality of nozzles are arranged in a circular array and the second plurality of nozzles is also arranged in a circular array.

4. The spray head of claim 1, wherein the other of the first spray pattern and the second spray patterns pattern is a conical shape or a cylindrical shape.

5. The spray head of claim 1, wherein the second spray pattern has the hyperboloidal shape and the first spray pattern has a conical shape.

6. The spray head of claim 1, wherein the second spray pattern has the hyperboloidal shape and the first spray pattern has a cylindrical shape.

7. The spray head of claim 6, wherein the cylindrical shape of the first spray pattern is one of a misting spray or an aerated spray.

8. The spray head of claim 1, wherein both the first spray pattern and the second spray pattern have a hyperboloidal shape.

9. The spray head of claim 1, wherein the first spray pattern has a first hyperboloidal shape and the second spray pattern has a second hyperboloidal shape that is different from the first hyperboloidal shape.

10. The spray head of claim 9, wherein an outer end of the second spray pattern is nested within an outer end of the first spray pattern.

* * * * *